and Stanger
United States Patent [19]
Kudo et al.

[11] Patent Number: 4,511,588
[45] Date of Patent: Apr. 16, 1985

[54] PRESERVABLE GRANULAR TOFU (SOYBEAN CURD) AND THE PROCESS OF PRODUCTION THEREOF

[75] Inventors: Shiro Kudo, Shizuoka; Mitsuyoshi Hayashi, Nagano, both of Japan

[73] Assignees: Asahi-Matsu Foods Inc., Nagano; Mitsubishi Corporation, Tokyo, both of Japan

[21] Appl. No.: 486,702

[22] Filed: Apr. 20, 1983

[51] Int. Cl.$^3$ ............................. A23J 3/00; A23L 1/20
[52] U.S. Cl. ..................................... 426/302; 426/310; 426/634; 426/656
[58] Field of Search ................... 426/93, 99, 302, 310, 426/634

[56] References Cited

U.S. PATENT DOCUMENTS

| | | | |
|---|---|---|---|
| 2,279,202 | 4/1942 | Musher | 426/99 |
| 3,140,811 | 2/1964 | Ogasa et al. | 426/634 |
| 3,406,081 | 10/1968 | Bauer et al. | 426/302 X |
| 3,492,128 | 1/1970 | Brennan et al. | 426/302 |

FOREIGN PATENT DOCUMENTS 56-50940  2/1981  Japan .................................. 426/634
399648  10/1933  United Kingdom .................. 426/99

Primary Examiner—Robert Yoncoskie
Attorney, Agent, or Firm—Toren, McGeady and Stanger

[57] ABSTRACT

Preservable granular particulate "tofu" (soybean curd), which is smooth and does not liberate water during storage and therefor is suited to an alternative for salad topping, tofu spread and scrambled egg, can be produced by coagulating soybean milk or soybean protein paste in heated oil at a temperature between above 75° C. and below 140° C. The soybean milk is of a higher concentration than that conventionally used for producing ordinary tofu. Hardening of the granular tofu which is caused with increased solid contents can be overcome by elevating the pH of the paste as compared with that used in production of ordinary tofu. A small amount of egg white is desirably added to coagulate the soybean milk smoothly in a shorter period of time in heated oil. The granular tofu thus prepared is preservable and does not liberate water during storage, because the coagulation is done at a higher temperature than in the case of ordinary tofu, and the surface of granule is covered with an oily film.

4 Claims, 2 Drawing Figures

FIG. 1(a) Typical Granular Tofu Product
(Example 1)
FIG. 1(b) Granular (Spherical) Tofu Product
(Example 2)

PRESERVABLE GRANULAR TOFU (SOYBEAN CURD) AND THE PROCESS OF PRODUCTION THEREOF

BACKGROUND OF THE INVENTION

The present invention relates to granular tofu which is produced from soybean milk or soybean protein paste prepared by the usual way from whole or defatted soybeans and contains 6% to 15% protein and the surface of which is coated with an oily film, thus effective to reduce water liberation as well as to improve preservability. This inventiion also relates to the process for producing the above product.

Tofu is one of traditional soybean protein foods in Japan. In recent years, the nutritive value of tofu as a healthy food has been highly appreciated for its vegetable protein, low caloric and cholesterol contents, and the demand of tofu has been increasing also in U.S.A. Tofu commercially available in U.S.A. is the same as that in Japan (silk-strained tofu—called "Kinugoshi" or cotton-strained tofu—called "Momen"), but the way of eating or cooking tofu is quite different; in U.S.A. tofu is seldom served alone, but applied as, for example, salad topping, spread on bread or canapé, or as an alternative for scrambled egg. However, if a lump of tofu is divided by stirring to prepare spread or an alternative for scrambled egg, its high water content will readily cause water liberation and therefore, greater labor has been required so as to remove as much water as possible from the lump before use.

Moreover, it has been conventionally often experienced that tofu can rot in a relatively very short time, but recently it can be preserved for about 10 days in a refrigerator owing to the hygienically improved process of production and the improved packaging material. However, U.S.A. is too large and wide a country to supply the tofu product to consumers within the period. As a result, consumers are often compelled to be patient with slightly soured tofu products. Meanwhile, perfectly preservable tofu is available as sterilized packing product (U.S. Pat. No. 4,140,811), but it is too expensive to attain a large market.

In this situation, preservable granular tofu with minimal tendency of liberation of water, if it is commercially realized, will meet consumer's need and further extend the market of tofu.

The present inventors have conducted extensive studies and experiments to develop the process for producing graular tofu which is preservable with substantially no tendency of water liberation and also suited to salad topping, spread and an alternative for scrambled egg, and the present invention has been completed on the basis of results of these studies and experiments.

SUMMARY OF THE INVENTION

According to the process of the present invention, a tofu product can be produced which is twice as much preservable as ordinary tofu and never liberates water during storage, and the features of the process reside in that an appropriate coagulator is added to a soybean milk, which is of a higher concentration than that for production of ordinary tofu, or to a soybean protein paste, and the mixture is poured in oil heated at a temperature between above 75° C. and below 140° C., to coagulate the milk or the bean protein paste in a granular state. The characteristic properties of the product, that is preservability and freedom from water liberation, are achieved from the oily film or coat covering the surface of granules.

Further, according to the present invention, the possible increase of hardness of the tofu product due to the increased solid content can be prevented by adjusting the pH of the soybean milk or soybean protein paste to a more alkaline region than that in production of ordinary tofu (pH=5.7 to 6.4).

Still further according to the present invention, coagulation of soybean milk or soybean protein paste in an oil can be performed smoothly by adding a small amount of egg white as auxiliary coagulation agent.

BRIEF EXPLANATION OF THE DRAWING

FIG. 1(a) and FIG. 1(b) are respectively a photograph showing the products according to the present invention.

DETAILED DESCRIPTION OF THE INVENTION

The present invention will be described in more detail hereinbelow.

A soybean milk prepared from whole or defatted soybean in the usual manner, or a soybean protein paste prepared by separating soybean protein from soybean milk and concentrated is adjusted to contain 6% to 15% of solid protein. To this is added as a coagulator, a calcium salt such as calcium sulfate, a magnesium salt such as magnesium chloride or a substance such as glucono-delta-lactone which produces an acid when heated, either alone or in a combination, and after the pH is adjusted to 6.5 to 7.5, the mixture is poured into stirred oil heated to a temperature between above 75° C. and below 140° C. for coagulation. The dependence of the appearance and the hardness of the coagulated product on the temperature of oil is shown in Table 1. Typical granular products according to the present invention are shown in FIG. 1(a).

TABLE 1

| Temperature* of Oil | Coagulated Substance | | |
|---|---|---|---|
| | Appearance | Hardness** | Color |
| 75° C. | Not coagulated | — | — |
| 80° C. | Granular | 0.19 | White |
| 90° C. | Granular | 0.29 | White |
| 100° C. | Granular | 0.35 | White |
| 110° C. | Granular | 0.43 | White |
| 120° C. | Granular | 0.57 | White |
| 130° C. | Granular | 0.70 | White |
| 140° C. | Bubble-shaped | 1.20 | Grayish |
| 150° C. | Bubble-shaped | 2.80 | Gray |

*The figures show the average temperature of oil, which varies ±2° C. during the addition of the soybean milk.
**Hardness is measured as follows: the coagulated substance is placed in a cylindrical vessel of 4 cm in diameter and 2 cm in thickness, and a texturometer (Zenken) is operated with 2 mm in clearance, 1 in attenuation and at 5.0 V.

As seen in Table 1, coagulation does not occur at 75° C., but a white coagulated matter can be obtained at a temperature ranging from 80° C. to 130° C. Bubbles inside the particles are broken at temperatures of 140° C. or higher, and hard bubble-shaped films are formed and the color turns into gray. Between 130° C. and 140° C., the appearance of the coagulated product changes from a granular shape to a bubble-shaped film. The hardness increases with the increase of temperature of the oil. Preferably the coagulation is effected at a temperature between 80° C. to 110° C. to obtain smooth products.

When the soybean milk or the soybean protein paste contains less than 6% of solid protein, insufficient coagulation occurs in heated oil, and causes ready liberation of water on standing. Above 15%, however, the handling becomes difficult because of too high viscosity of the paste. Therefore, it is preferred the soybean milk or soybean protein paste maintains the solid protein content of 6% to 15%, which is higher than that of ordinary tofu (4% to 6% as solid protein content). To obtain the product having smooth and soft mouth touch, however, the solid protein content of 8% to 12% is most favorable.

In the next place, dependence of hardness of the coagulated matter on pH of the soybean protein paste is shown in Table 2, where a soybean protein paste containing 9% of solid protein is treated in oil heated at 105° C.

TABLE 2

| pH | Hardness | Texture (Functional Estimation) |
|---|---|---|
| 6.0 | 0.52 | Hard and brittle |
| 6.5 | 0.40 | Smooth but slightly hard |
| 7.0 | 0.31 | |
| 7.5 | 0.20 | Soft and smooth |
| 8.0 | not coagulated | |

As is apparent in Table 2, a smooth product can be obtained when the soybean milk is coagulated at pH 6.5 to 7.5, a slightly higher pH than that of ordinary tofu (pH 5.7 to 6.4).

Further, if egg white is added to the soybean milk or the soybean protein paste in the amount of 3% to 30% of the solid matter, the time necessary for the coagulation is shortened and thereby a granular tofu can be produced smoothly and its shape becomes prefectly spherical as shown in FIG. 1(b). The effect cannot be expected when less than 3% of egg white is added, and when added more than 30%, slightly harder products is obtained having egg white odor. The most favorable amount of the egg white for obtaining the product having smooth and soft mouth touch is 10% to 25%.

The coagulators to be used in this invention include calcium or magnesium salts or glucono-delta-lactone, as they are used in the ordinary tofu manufacturing, either alone or in combination. The desirable amount of addition of a coagulator is from 1% to 5% with respect to the solid matter of the soybean protein in the soybean milk or soybean protein paste. Addition of less than 1% of coagulator is insufficient to effect desired coagulation, but when added more than 5%, too hard a texture is produced which tastes bitter and astringent due to the presence of excessive coagulant.

Any oil may be used for the coagulation as long as it is suitable for cooking. Particularly smooth products can be produced with use of soybean oil, corn oil and rape oil, either alone or as a mixture thereof, or as a mixture with palm oil.

Preservability of the granular tofu produced by the process of the present invention will be illustrated hereinbelow. The granular tofu of this invention is compared with ordinary cotton-strained tofu which is crumbled into a granular form with respect to the water liberation and the deterioration when stored at 10° C.

TABLE 3

| Storage Period (day) | Granular Tofu of Present Invention | | | Ordinary Tofu Crumbled into Granular Form | | |
|---|---|---|---|---|---|---|
| | Liberation of Water | pH | Odor | Liberation of Water | pH | Odor |
| 0 | — | 6.8 | Normal | ± | 6.2 | Normal |
| 5 | — | 6.8 | Normal | ++ | 5.9 | Normal |
| 8 | ± | 6.7 | Normal | ++ | 5.5 | Normal |
| 10 | ± | 6.7 | Normal | ++ | 5.3 | Slightly nasty |
| 12 | ± | 6.7 | Normal | +++ | 5.1 | Nasty |
| 15 | ± | 6.6 | Normal | +++ | 5.0 | Nasty |
| 18 | ± | 6.4 | Normal | +++ | 5.2 | Rotten |
| 20 | + | 6.2 | Normal | +++ | 5.2 | Rotten |
| 22 | + | 6.0 | Slightly nasty | +++ | 5.4 | Rotten |

As is clearly shown in Table 3, the ordinary tofu crumbled into a granular form can be edible for only 8 days when kept at 10° C., but the granular tofu prepared by the process of this invention remains edible for 20 days when kept at 10° C., thus demonstrating much better preservability as compared with the ordinary tofu. This is because the oily coating film on the surface of granules preclude the invasion of microorganisms from the outside and probably because the number of the microorganisms remaining in the granule may be smaller than that of the ordinary tofu due to the high coagulation temperature.

In conclusion, the granular tofu produced by the process of this invention provides preservable and a useful tofu product which is conveniently applied as salad topping, spread and an alternative to scrambled egg. Various commercial applications may be developed, when fat, oil, casein, gelatine or natural pastes are added to the soybean milk or the soybean protein paste to change the texture, or different taste is given by adding any seasoning, spices, coloring materials and flavors.

The present invention will be better understood from the following description of preferred embodiments.

EXAMPLE 1

While soybeans in an amount of 1 kg were soaked overnight in water. The beans with addition of 5 kg of water were ground, boiled for a minute and the solid matter was removed by filtration, to obtain about 5 kg of soybean milk. When the temperature of the milk fell below 50° C. 10 g of calcium sulfate was added thereto and the pH was adjusted to 7.0. This was poured into a stirred soybean oil at 120° C., when the milk turned into granular tofu. The coagulated matter was easily separated from the oil with metal meshes. The obtained coagulated matter tasted smooth and the texture was good enough. The product is shown in FIG. 1(a). During the storage at 10° C. for 18 days, the taste was kept in a good condition, without any appreciable water liberation.

EXAMPLE 2

To 5 kg of soybean milk prepared in the same way as in Example 1, 500 g of liquid egg white (the solid matter amounted to 12%), 12 g of magnesium sulfate as coagulator and 0.4 g of β-carotene as coloring material were added. After the pH was adjusted to 7.5, this was poured into a mixture oil of 1:1 of corn and palm oils heated to 100° C., to obtain a spherical coagulated material as shown in FIG. 1(b). This was stored for 18 days at a temperature of 10° C. Good condition was maintained as in Example 1.

EXAMPLE 3

To 0.5 kg of separated soybean protein of which the protein content was 90%, 2.5 kg of water was added and the whole mixture was vigorously stirred to make an emulsion. To this emulsion 3 g of glucono-delta-lactone and 6 g of calcium sulfate were added and the pH was adjusted to 7.5. This was poured into a stirred corn oil at 110° C., when a granular coagulated matter was obtained. This product, holding good moisture content and flavour, could be well preserved for 15 days at 10° C.

EXAMPLE 4

Soybean milk (10 kg) was produced from 1 kg of whole soybeans in usual manner. After adding citric acid and adjusting the pH to 4.7, the soybean protein was coagulated. The coagulated matter was collected from liquid by filtration and water was removed by centrifugation. To the curd thus obtained, a sodium hydroxide solution and water, in the amount just enough to neutralize the acidic content, were added and the whole mixture was made homogeneous with a mixer. The solid protein content of the dispersed protein paste was adjusted to 8%. To the paste (4 kg), 150 g of powdery egg white was added and the mixture was treated with a homogenizer to assure homogenuity. After addition of 4 g of calcium chloride and adjusting the pH to 6.5, the mixture was poured into stirred soybean oil at 80° C. The soybean protein paste turned into a coagulated spherical form. The product, having smooth texture, was of good taste and did not suffer from any water liberation.

EXAMPLE 5

To 1 kg of separated soybean protein (the protein content amounted to 90%), 10 kg of water, 500 g of a sodium salt of milk casein, 300 g of palm oil, 6 g of kitchen salt, 12 g of calcium chloride and 0.3 g of cheese flavor were added. The whole mixture was treated with a mixer, emulsified with a homogenizer, and the pH was adjusted to 6.8. The mixture was poured into a stirred corn oil at 120° C., to obtain a granular coagulated matter. The matter had taste and texture similar to those of cottage cheese and could maintain them for 20 days by keeping it at 10° C.

What we claim:

1. A process for producing granular tofu free from water liberation comprising preparing soybean milk or soybean protein paste from whole or defatted soybeans, adding to said milk or paste a coagulator selected from the group consisting of calcium salts, magnesium salts and glucono-delta-lactone, pouring the mixture into heated oil at temperature between above 75° C. and below 140° C. to obtain a granular particulate product having a surface coated with oily film.

2. The process of claim 1, in which the solid protein content of the soybean milk or soybean protein paste lies in a range from 6% to 15%.

3. The process of claim 1, which further comprises adding egg white in an amount of 3% to 30% based on the solid content of the liquid milk or soybean paste.

4. The process of claim 1, in which the pH of the soybean milk or the soybean protein paste lies in a range from 6.5 to 7.5.

* * * * *